Aug. 7, 1928.
R. EISENBERG ET AL
1,679,965
VANITY CASE AND POCKETBOOK FOR ANIMAL HEADS
Filed June 28, 1926
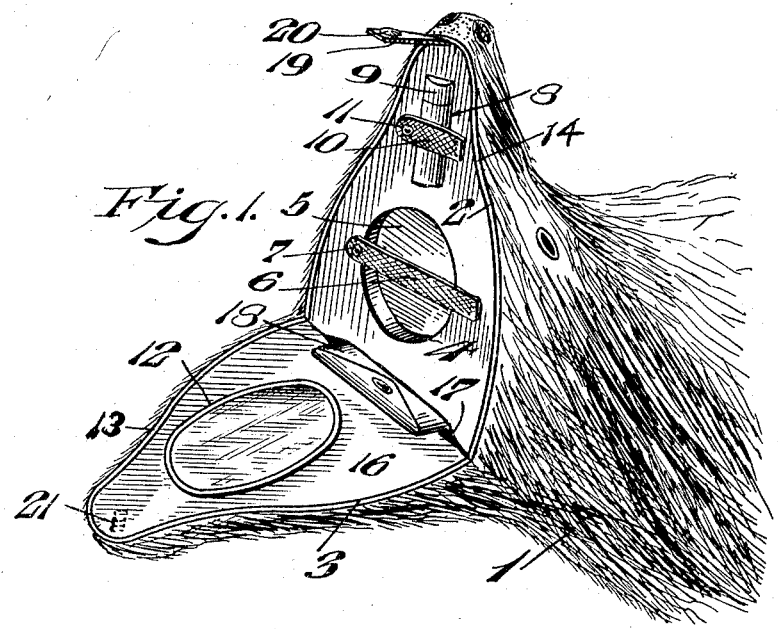
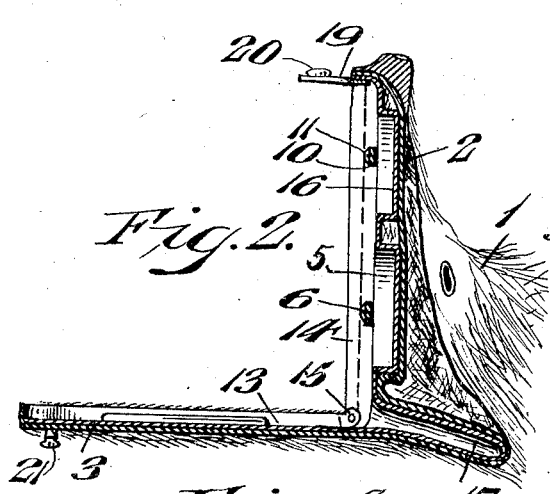
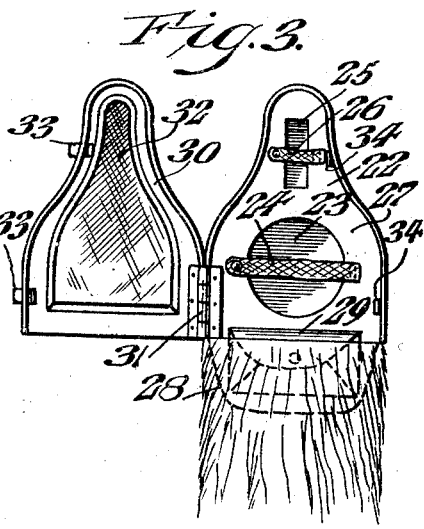
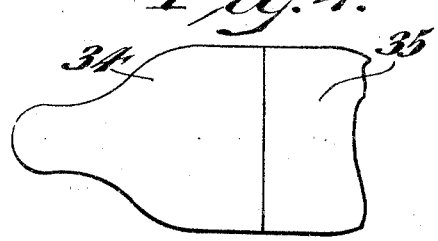
Inventors
Robert Eisenberg
Max Rajewsky
By Herbert S. Fairbanks
Attorney Patented Aug. 7, 1928.

1,679,965

UNITED STATES PATENT OFFICE.

ROBERT EISENBERG AND MAX RAJEWSKY, OF CHICAGO, ILLINOIS.

VANITY CASE AND POCKETBOOK FOR ANIMAL HEADS.

Application filed June 28, 1926. Serial No. 119,042.

The object of this invention is to devise a novel vanity and pocket book container for animal heads such as for example the fur head of an animal scarf, or for animal heads which can be attached to and form a part of the fur or other trimming of a garment.

The animal heads having the vanity and pocket book container can be sold to the cloak, suit or other trade as an article of commerce, since the fur head can be used in conjunction with a band of fur on cloth or fur coats around the collar or cuff portions, or it can be in the form of an animal scarf.

With the above and other objects in view as will hereinafter more clearly appear, our invention comprehends a novel construction and arrangement of an animal head provided with a vanity and pocket book container.

It further comprehends a novel construction and arrangement of a vanity and pocket book container which is adapted to be assembled with respect to an animal head.

It further comprehends a novel vanity and pocket book container, comprising two hinged members having a depressed pocket to receive vanity appliance and provided with means to retain the appliances in their pocket. A lining is also provided which is preferably tensioned across the line or plane of its hinged connection and extends rearwardly of said hinged connection, so that, when a pocket book is inserted, it will be retained in the pocket or pouch provided for it, and can not accidentally fall out of its pocket.

One side of the lining or frame work has secured thereto in any desired or conventional manner, a mirror, the contour of which may vary as may be desired.

The vanity and pocket book container may be formed either with or without a frame portion and it may be hinged at the inner end or at the side, as may be desired.

Other novel features of construction and advantage will hereinafter more clearly appear in the detailed description and the appended claims.

For the purpose of illustrating the invention, we have shown in the accompanying drawing typical embodiments of it, which, in practice, will give reliable and satisfactory results. It is, however, to be understood that these embodiments are typical only, and that the various instrumentalities of which our invention consists can be variously arranged and organized, and the invention is not, therefore, limited to the precise arrangement and organization of these instrumentalities as herein set forth.

Figure 1 is a perspective view of an animal head in conjunction with which a vanity and pocket book container embodying our invention is employed.

Figure 2 is a sectional view of Figure 1, the jaws being in open position.

Figure 3 is a plan view of another embodiment of the invention, wherein the sections of the vanity and pocket book container are hinged at the side, instead of at their inner ends as shown in Figures 1 and 2.

Figure 4 is a plan view of another form of container members.

Similar numerals of reference indicate corresponding parts.

Referring to the drawings:—

1 designates a fur animal head in conjunction with which a vanity and pocket book container embodying our invention is employed.

This vanity and pocket book container comprises two sections or members 2 and 3, respectively, which are formed of any desired material such as, for example, card board, fibreboard, or metal.

The section 2 is provided with a recess or pocket 4 which is open at its top, and which is adapted to receive a compact 5, which is secured within its pocket 4 by means of a strap 6, having one end fixed to the sections 2, and having its other end provided with a snap fastener 7 which engages a co-operating part on the section 2.

The section 2 converges towards its outer end, and, within such converging portion of the section 2, a recessed pocket 8 is provided which conforms to the shape of and which is adapted to receive a lip stick 9, which is secured in place by a strap 10, one end of which is connected with the section 2, and the other end of which is provided with a snap fastener 11 co-operating with a part fixed to the section 2.

The section 3 of the container, has secured to it, in any desired manner, a mirror 12. In Figures 1 and 2, the section 3 is provided with a marginal flange 13 which may be of the same material as that of section 3, or it may be made of metal or other suitable material and secured to its section in any desired or conventional manner.

In a similar manner, the section 2 is provided with an outwardly extending flange or raised marginal edge 14. The flanges 13 and 14 are pivotally connected at opposite sides of the container as at 15.

16 designates a lining which is secured by sewing or by adhesive to the exposed faces of the sections 2 and 3, so that the lining preferably covers the walls of the pockets 4 and 8, and also extends rearwardly of the hinged portion 15 to form a pouch or pocket 17, adapted to receive a conventional type of pocket book 18.

It will be seen that the lining across the point of pivotal connection of the two sections is preferably secured in such a manner that, when the pocket book is inserted as shown in Figure 1, the juxtaposed portions of the lining will form pressure on the pocket book, to retain it within its pouch.

One of the jaws, for example the upper sections 2 of the container, is provided at its extreme outer end or tip with a strap 19, having a snap fastener 20, which is adapted to lock with a post 21 carried by the container section 3.

The container is secured to the animal head in any desired manner, for example, by means of adhesive or by sewing it in place, and when the container is locked, thereby locking together the jaws of the animal head, the vanity and pocket book container will be fully concealed within the head.

In the embodiment seen in Figure 3, the construction is similar to that already described, except that the container sections are hinged together and locked in a different manner, and a different shape of mirror is shown.

In this embodiment, a container section 22 is provided with the pocket 23 for the compact and with a retaining strap 24 similar to that seen in Figure 1, and also with a lip stick receiving pocket 25 and a retaining strap 26 similar to that seen in Figure 1.

The lining 27 in this embodiment is extended into the fur portion of the head to form a pocket 28 which is open at the outer end to receive a pocket book 29.

The other container section 30 is hinged at its side near its inner end as at 31 to the section 22 so that it opens side-wise. The mirror 32 carried by the container section 30 is of different contour from the mirror 12 seen in Figure 1, which, of course, may have any desired contour.

In order to lock the sections together, I provide the side locking members 33, which are preferably in the form of suitable catches co-operating with the catch receiving members 33, secured to the container section 22.

It will be understood that, in this form, each container section is covered with fur, so that, when the sections are closed, and locked, the animal scarf will have the usual appearance of a fur covered animal head.

In the form seen in Figure 4, the pivotally connected blanks 34 and 35 do not have the raised edges or marginal flanges, and the rest of the container including the pockets, fastening means and lining is similar to that already described.

In all of the embodiment of our invention, the fur or hair of the animal head covers the entire jaws, so that, when the jaws are closed, the vanity and pocket book container will be entirely concealed within the head.

In our present invention, we provide the container with recesses corresponding to the contour of the compact and lip stick and provide independent means for retaining them in position.

It has been heretofore proposed in the application of Eisenberg and Siefert to form an animal head lining with a vanity container having a pocket, which forms a pouch to receive the loose change of the person who carries the animal head.

In our invention, we employ a pocket book receiving pouch, and the container sections are hinged only at opposite sides so that the lining is stretched across the mouth of the pouch opening and a tension is preferably placed on the mouth of the pouch to resiliently hold the pocket book.

The same will preferably hold true of the pocket or pouch 28 seen in Figure 3.

It will be understood that, in the form seen in Figure 3, both jaws are covered with fur or hair of the animal, so that, when the container sections are closed, the fur will entirely conceal the container within it.

In this form one of the jaws, which may be either the upper or the lower jaws, is hingedly connected at the sides to the other jaw so that one of the jaws can be swung substantially one hundred and eighty degrees and the vanity appliances and the pocket book are readily accessible when the jaws are open.

Having thus described our invention what we claim as new and desire to secure by Letters Patent, is:—

1. A vanity and pocket book container comprising two substantially flat hinged members conforming in contour to the shape of animal jaws, one of said members having depressed pockets to receive vanity appliances, a lining for said members forming a pouch extending beyond the plane of hingeing of said members, a mirror carried by one of said members, and means to secure the members in closed position.

2. The combination with an animal head having an upper and a lower jaw, of a vanity and pocket book container comprising two hinged members secured in and to said jaws, a lining covering the inner faces of said members and secured thereto, said lining being tensioned across the plane of hingeing and also extending rearwardly beyond the plane of hingeing to form a pouch, said lining having means to receive vanity appliances, and means to secure said jaws in closed position.

ROBERT EISENBERG.
MAX RAJEWSKY.